United States Patent [19]

McCormick

[11] 4,236,862

[45] Dec. 2, 1980

[54] MATERIAL HANDLING APPARATUS

[75] Inventor: Edward J. McCormick, Greene, N.Y.

[73] Assignee: The Raymond Corporation, Greene, N.Y.

[21] Appl. No.: 30,082

[22] Filed: Apr. 16, 1979

[51] Int. Cl.3 .......................... B60P 1/34; B66F 9/14

[52] U.S. Cl. .......................... 414/633; 414/631

[58] Field of Search .......................... 414/607, 630-638, 414/666, 667, 670, 671

[56] References Cited

U.S. PATENT DOCUMENTS

| | | | |
|---|---|---|---|
| 3,643,825 | 2/1972 | Zane, Jr. | 414/607 |
| 3,907,140 | 9/1975 | Jinks | 414/631 X |
| 3,937,346 | 2/1976 | Van der Laan | 414/666 |
| 3,998,346 | 12/1976 | Gibson et al. | 414/666 |

FOREIGN PATENT DOCUMENTS

| | | | |
|---|---|---|---|
| 271633 | 4/1964 | Australia | 414/666 |

*Primary Examiner*—Jeffrey V. Nase

*Attorney, Agent, or Firm*—Richard G. Stephens

[57] ABSTRACT

Provision of an auxiliary mast which is tiltable, as well as being laterally shiftable and rotatable about a vertical axis, allows loads to be handled without the top of the mast damaging previously-stored loads or limiting fork entrance into a storage rack.

9 Claims, 4 Drawing Figures

MATERIAL HANDLING APPARATUS

This invention relates to mast tilting arrangements used on material handling apparatus, and more particularly to an improved mast arrangement for lift trucks having two separate vertical lifting mechanisms. In some applications it is desirable that an operator be raised and lowered along a mast to handle full pallet loads with forks, principally because the better visibility which such a procedure affords allows him to control storage and retrieval of such loads faster with greater safety and less damage to loads and racks than if he remained stationed at the base of the truck. Raising and lowering an operator compartment takes substantial energy due to the weight of such a compartment, and the weight and inertia it adds to a lifting system makes it difficult to make small, fine corrections in vertical positions. Battery energy can be conserved and fine control enhanced if small vertical adjustments can be made by use of an auxiliary lifting system rather than raising the operator compartment to make such adjustments. One object of the invention is to provide an auxiliary lifting system for a lift truck having an elevatable operator compartment or station.

In a truck which has an elevatable operator compartment and which is adapted to handle pallet-size loads, it is usually necessary or desirable that load forks be lowerable all the way to a floor to allow pallets to be picked up from the floor. If one fixedly mounts load forks near the bottom of the operator compartment, the highest elevation to which one can raise the forks then tends to be a distance below the ceiling equal to the height of the operator compartment. By provision of an auxiliary lifting mechanism which will raise and lower a fork carriage to vary fork level relative to the bottom and the top of an operator compartment, one can materially increase the volume of goods which can be stored in a given floor area, which is of important economic significance.

The broad idea of providing an auxiliary lifting mechanism on a truck having an elevatable operator compartment is not new. In the use of a class of trucks commonly called order-pickers, an operator is raised and lowered adjacent storage compartments in a storage rack so that he may readily reach from his position aboard the truck into a storage compartment either to retrieve an article, which he normally places on a pallet or the like carried by the truck, or to store an article, which he typically lifts from a pallet or bin or like aboard the truck. Operator convenience and efficiency are enhanced if the operator is within easy reach of both articles in a rack and the pallet or other on-board device where articles are carried, so that he does not have to bend over, for example, to retrieve or store a given article at a given storage compartment. While the operator may raise and lower his platform to put himself at a convenient vertical height relative to storage shelves or stored articles, his efficiency can be increased if an auxiliary vertical lifting mechanism can provide short fine adjustments in elevation of a pallet on a truck, and various means such as scissors mechanisms have been provided aboard some order picker trucks to allow small vertical adjustments of the pallet. However, when pallet-size loads are to be handled substantially greater weights must be handled by an auxiliary lifting mechanism. And importantly, handling efficiency is greatly increased when pallet-sized loads are handled, if the operator can service both sides of an aisle rapidly. Both sides can be serviced if the truck load carriage can be rotated 180 degrees about a vertical axis and laterally shifted. Thus another object of the invention is to provide an improved lifting mechanism having both an elevatable operator compartment and an auxiliary lifting mechanism which allows load forks to be rotated about a vertical axis and laterally shifted.

The broad idea of providing a mast which is rotatable about a vertical axis and also laterally shiftable is not in itself new, such an arrangement being shown in U.S. Pat. No. 3,907,140. The mast there shown is not an auxiliary mast, however, but the only mast used on a vehicle. Furthermore the mast shown therein is not tiltable.

When an operator compartment, a side-shifting carriage, and a fork rotating mechanism are supported seriatim on a main mast each such device tends to contribute some deflection, with the result that the auxiliary mast tends to deflect top forwardly relative to the bottom, forwardly being the direction in which the forks are pointing. When an auxiliary mast is so deflected, if it is shifted far enough toward a storage rack to place a load completely within a desired storage compartment, the top of the auxiliary mast can extend somewhat into an upper compartment and damage a load stored there. Even if there is no load stored in the upper compartment, the mentioned deflection can complicate and slow down material handling operations. Lateral shifting of the mast toward a storage rack is limited to a point where an upper portion of a deflected mast engages a shelf or rack beam, tending to prevent one from depositing a load as far into a rack as may be desired, and in such a case an operator may have to perform a "double bite" procedure which involves setting the load down, slightly retracting the forks, re-lifting the load with it sitting further toward the tips of the forks, reextending the forks, and then lowering the load. In accordance with an important concept of the present invention, these disadvantages are overcome by use of a small auxiliary mast which is tiltable as well as being rotatable about a vertical axis and being laterally shiftable. Thus a primary object of the invention is to provide a lift truck mast which is tiltable as well as being rotatable about a vertical axis, and a further more specific object is to provide such a mast which is also laterally shiftable.

Another object of the invention is to provide a lift truck mast which can be rotated about a predetermined substantially vertical axis irrespective of whether the mast then extends along that axis or is instead tilted relative to that axis.

A further object of the present invention is to provide an improved mast which is not only rotatable about a substantially vertical axis, but also tiltable about a pivot axis adjacent the upper extremity of the mast.

Other objects of the invention will in part be obvious and will, in part, appear hereinafter.

The invention accordingly comprises the features of construction, combinations of elements, and arrangement of parts, which will be exemplified in the constructions hereinafter set forth and the scope of the invention will be indicated in the claims.

For a fuller understanding of the nature and objects of the invention, reference should be had to the following detailed description taken in connection with the accompanying drawings, in which.

Figure 1:
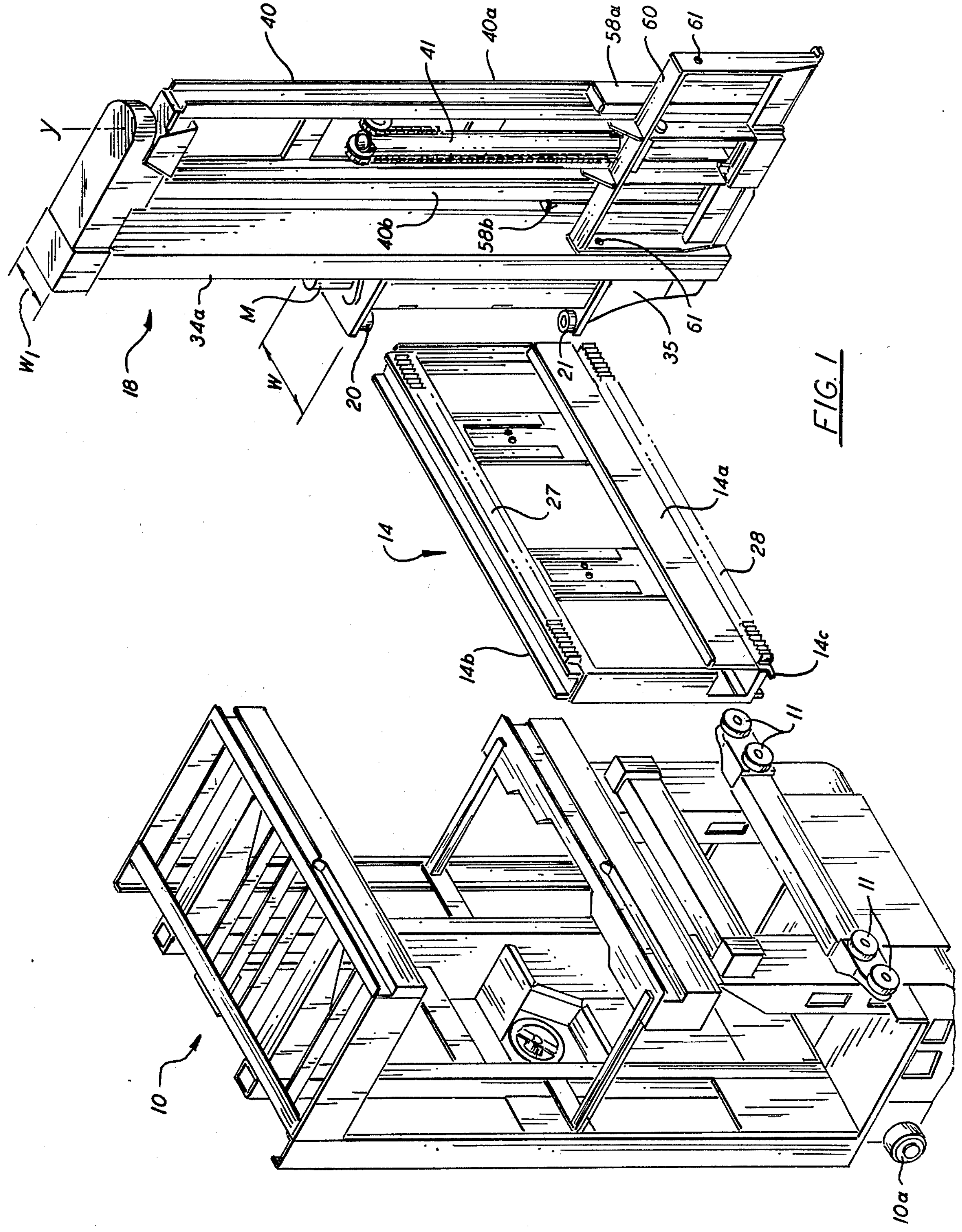
FIG. 1 is an exploded isometric view illustrating an operator compartment, an intermediate carriage and a load handler utilized in one form of truck according to the invention.

In FIG. 1 three major portions of one form of truck incorporating the present invention are shown in an exploded arrangement. An operator compartment 10 shown at the left is carried on a vehicle-carried main mast (not shown), and raised and lowered along the main mast in conventional fashion, with rollers such as roller 10*a* nesting between flanges of the main mast vertical members.

Intermediate carriage 14 is mounted on the forward side of the operator compartment structure and is laterally shiftable relative thereto a short distance, typically of the oreder of 6 to 9 inches (15.24 to 22.86 cm.). Rollers 11, 11 on the compartment structure 10 ride on a channel 14*a* portion of the intermediate carriage. Further rollers journalled on structure 10 which are rotatable about vertical axes nest in the recess between lower flanges of an upper I-shape member 14*b* and in the recess between upper flanges of a lower I-shape member 14*c* of the intermediate carriage to support the intermediate carriage on the operator compartment structure and allow relative lateral movement. A hydraulic ram (not shown) is connected between the structure 10 and the intermediate carriage to move the latter laterally. The intermediate carriage may incorporate various features of an improved carriage construction shown in commonly-assigned Appl. Ser. No. 029,780 filed on Apr. 13, 1979 by Christian D. Gibson.

Figure 2:
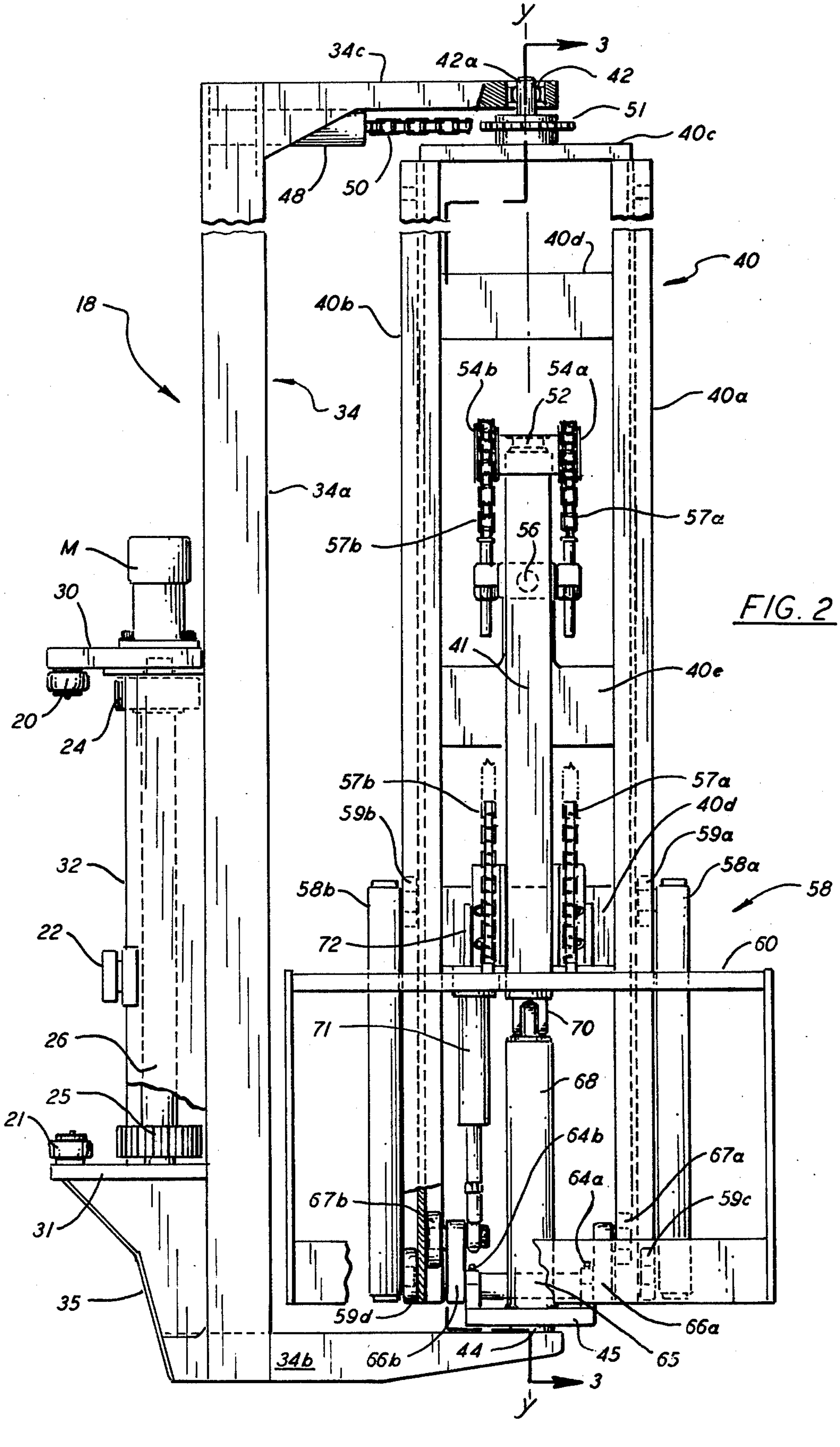
FIG. 2 is a side elevation view of the load handler shown in FIG. 1.
Figure 3:
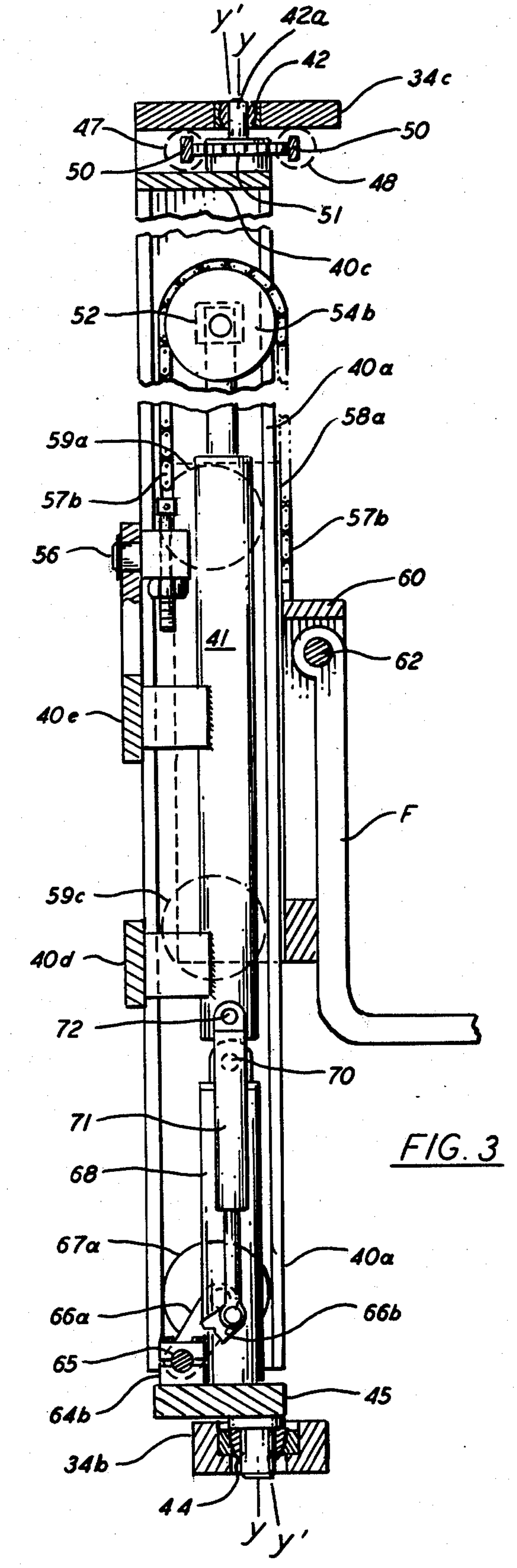
FIG. 3 is a semi-diagrammatic cross-section view taken at lines 3—3 in FIG. 2, with certain parts cutaway or omitted and certain parts added for sake of clarity.

A load handler assembly 18 which includes the improved rotatable mast arrangement of the present invention, and which is also illustrated in FIGS. 2 and 3 is carried on the forward face of intermediate carriage 14. Upper and lower roller pairs 20, 21 journalled on the load handler nest in the upper recess between flanges of I-member 14*b* and in the lower recess between flanges of I-member 14*c* to suspend the load handler on the intermediate carriage. Roller 22 (FIG. 2) on the rear side of the load handler rides atop channel 14*a* to transmit vertical force to the intermediate carriage. Pinions 24, 25 interconnected by shaft 26 journalled on the load handler engage respective racks 27, 28 on the intermediate carriage, with the result that lateral load moments applied to the load handler are converted to pure translational forces on the racks, allowing the load handler to have very modest width (dimension W1 in FIG. 1). Traverse motor M rotates shaft 26 and pinions 24, 25 to move the load handler back and forth across the face of the intermediate carriage. The rack and pinion arrangement is not novel per se, a similar arrangement being shown in U.S. Pat. No. 3,998,346.

The roller pairs 20, 21 and roller 22 which support the load handler on the intermediate carriage are journalled on an upper plate 30, a lower plate 31 and a pair of plates, as at 32, all carried on the rear side of a C-shaped frame 34 formed by a vertically-extending box section member 34*a*, a heavy lower support arm 34*b*, and an upper support arm 34*c*. Provision of the C-shaped frame to support the rotatable and laterally-shiftable auxiliary mast above and below its upper and lower extremities has important advantages which are described and claimed in Appl. Ser. No. 030,122 filed Apr. 16, 1979 by Ralph E. Allen. Specifically, use of such a frame allows wider loads to be carried in an aisle of given width, and it advantageously decreases bending moments and inertial forces below those attainable with prior rotatable masts, as is described in greater detail in the Allen application.

Lower support arm 34*b* of the C-shaped frame, which supports the entire vertical load weight, is preferably a solid bar which extends through and is welded to the lower end of box section member 34*a*. Rear bracket 35 serves to stiffen the lower end of the C-shaped frame. Significantly, the upper and lower arm 34*c*, 34*b* of the C-shaped frame extend above and below the upper and lower extremities of the rotatable auxiliary mast 40, situating the vertical axis of rotation y—y of the mast substantially at the center of the mast, as viewed in two mutually-perpendicular horizontal directions. The arrangement shown will be seen to readily allow the auxiliary mast 40 to be rotated about axis y—y through the angle of 180 degrees required for servicing both sides of an aisle.

The auxiliary mast 40 is shown as comprising a pair of spaced-apart I-shape members 40*a*, 40*b* interconnected by an upper tie plate 40*c*, upper and lower cross tie members 40*d*, 40*d*, and a cross-tie member 40*e*. The cylinder of auxiliary lift ram 41 is fastened to lower cross-tie member 40*d* and member 40*e*. An upper ball joint 42 pivotally and slidingly interconnects upper tie plate 40*c* of the mast to upper arm 34*c* of the C-shaped frame, and a lower ball joint bearing 44 pivotally interconnects a lower base plate 45 of the mast and lower arm 34*b* of the C-shaped frame. A pair of hydraulic rams 47, 48 mounted at the top of the C-shaped frame connect to the ends of a length of chain 50 extending aroung sprocket 51 on upper tie plate 40*c*, so that extension of one ram and retraction of the other rotates mast 40 about vertical axis y—y.

The cylinder of lift ram 41 is fixedly connected to mast members 40*a*, 40*b* as previously mentioned. The end of its extendable arm carries a crosshead member 52 on which pulleys 54*a*, 54*b* are journalled. A tension equalizer lever 56 pivotally mounted on the crosstie 40*e* holds one end of each of lift chains 57*a*, 57*b*, which extend over pulleys 54*a*, 54*b* respectively and are anchored at the top of auxiliary carriage 58.

Carriage 58 comprises a pair of vertically-extending rigid members 58*a*, 58*b* each carrying a respective pair of rollers 59*a*–59*d*, rollers 59*a* and 59*c* journalled at the upper and lower ends of member 58*a* shown nesting between outer flanges of mast member 40*a*, and rollers 59*b* and 59*d* at the upper and lower ends of carriage member 58*b* shown nesting between outer flanges of mast member 40*b*. As best seen in FIG. 1, a rigid frame 60 welded to members 58*a*, 58*b* is adapted to carry load forks, F, F on a bar 62 (FIG. 3) which passes through holes 61, 61 (FIG. 1) in frame 60.

The vertical load on carriage 60 plus the weight of the auxiliary mast members and carriage is applied via pivot or knee joint 70 (FIG. 2) and post 68 to base plate 45, and thence via bearing 44 to lower arm 34*b* of the C-shaped frame. It will be apparent that extension and retraction of lift ram 41 raises and lowers carriage 58 up and down auxiliary mast 40 at double the speed of the ram speed.

Lower base plate or tilt plate 45 (FIG. 2) of the auxiliary mast is shown carrying a pair of bearing blocks 64*a*, 64*b* in which shaft 65 is journalled. A crank arm 66*a* on one end of shaft 65 carries roller 67*a* which is shown nested between the inner flanges of mast member 40*a*. A similar crank arm 66*b* on the other end of shaft 65 carries roller 67*b* which is shown nested between the inner flanges of mast member 40*b*. Crank arms 66*a* and 66*b* have the same length and extend from shaft 65 at the same angle. A heavy post or rigid arm members 68 having its lower end fixedly mounted on base plate 45 is pivotally connected at its upper end to the auxiliary mast members via a knee joint 70 shown provided on the lower end of auxiliary lift ram 41. The upper end of a double-acting tilt ram 71 is pivotally mounted at 72 on cross-tie member 40*d* of the mast, and the end of its extensible arm is pivotally connected to crank arm 66*b*, preferably radially nearer to shaft 65 than the connection of roller 67*b* to arm 66*b*. With tilt ram 71 in its retracted position shown in FIG. 3, the auxiliary mast members 40*a*, 40*b* extend vertically, parallel to axis y'—y'. As the tilt ram is extended crank arm 66*b* rotates shaft 65 clockwise as viewed in FIG. 3, so that crank arms 66*a* and 66*b* swing rollers 67*a*, 67*b* rightwardly and slightly downwardly, thereby pushing the lower end of the mast rightwardly relative to base plate 45 and lower bearing 44. Connection of ram 71 to arm 66*b* at a lesser radial distance from shaft 65 than rollers 67*a*, 67*b* allows a short ram stroke to provide greater forward translation of the bottom of the mast. As the lower end of the mast members are moved rightwardly or forwardly, with the upper end of the mast pivoting at upper bearing 42, it will be apparent that the mast experiences in effect a backward tilting, with the tilting occurring about an axis parallel to the axis of shaft 65. That axis extends in the same direction that mast members 40*a*, 40*b* are spaced apart from each other. The effective reverse tilting which occurs by forward translation of the bottom of the mast, can compensate for or cancel a top-forward tilting which deflections in the main mast, operator compartment and intermediate carriage may contribute. In a typical application tilting through a range of 0 to 3 degrees is deemed suitable, although the amount of reverse tilt required will vary in different applications.

As the lower ends of mast members 40*a*, 40*b* move rightwardly, base plate 45 and upper tie plate 40*c* also tilt slightly, so small clearance spaces are provided between these plates and the arms of the C-shaped frame. Provision of ball-joint or two-dimensional bearings 42 and 44 at the top and bottom of the auxiliary mast allows plates 45 and 40*c* to rotate slightly relative to the lower and upper arms of the C-shaped frame, about horizontal axes, as well as allowing rotation of the mast about vertical axis y—y. Further, when tilt ram 71 has been extended, it is not necessary to retract that ram and return the mast to a vertical position before swinging a load from one side of an aisle to the other side, since even when the auxiliary mast is tilted, the two dimensional bearings allow rotation of the tilted mast about axis y—y when it is tilted to extend along a slightly non-vertical axis, such as axis y—y in FIG. 3. It may be noted, that unlike most mast-tilting arrangements, the tilt axis of the mast of the present invention is above the top of the mast. As the mast is tilted from a vertical position, it will be appreciated that the shaft 42*a* of the upper bearing 42 slides very slightly downwardly, and hence that upper arm 34*c* of the C-shaped frame does not experience appreciable vertical loading. Inasmuch as lower spherical bearing 44 transmits all the vertical weight to the C-shaped frame, it ordinarily will use a much heavier two-dimensional bearing than that used at 42, and arm 34*b* will employ much heavier construction than arm 34*c*. It can be seen that if post or rigid member 68 were very short, so that knee joint 70 were situated a very short distance above lower arm 34*b*, that a given tilting of the mast would undesirably require much more tilting of post 68 and base plate 45 and result in greater stresses. Conversely, if post 68 were far longer than shown, the lift cylinder situated above it might have to be shortened to a point where it could not provide sufficient carriage travel. The lift cylinder should have a length approximately half the desired carriage travel, with its top located below the upper limit of carriage travel by an amount approximating the cylinder length, and within those constraints, the jackpost 68 is preferably made as long as possible.

While the present invention has been illustrated using the particular C-shaped frame construction of the laterally-shiftable and rotatable mast described and claimed in the Allen application, and while it is believed that the invention is particularly useful when a series of connected load-manipulating mechanisms tend to contribute to increased mast deflection, it will become apparent that the present invention is readily applicable to vehicles which do not employ elevatable operator compartments or means to laterally shift a rotatable mast. For example, it will be apparent that the auxiliary mast assembly shown herein could be modified in straightforward fashion to substitute a carriage having a scissors-reach mechanism for the single carriage shown, and thereby eliminate a need for the lateral-shifting mechanisms shown herein. It will be apparent that one could use two spaced apart lift rams instead of one, or two laterally-spaced posts in lieu of post 68.

Figure 4:
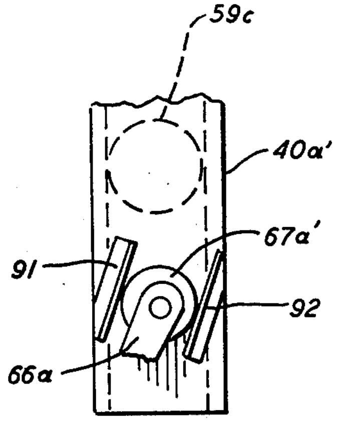
FIG. 4 is a side elevation detail view illustrating one possible modification of the invention.

It is not strictly necessary that members 40*a*, 40*b* comprise I-shapes. Since the tilt rollers travel only very short distances along members 40*a*, 40*b*, these members could comprise outwardly-facing channels, for example, with short length plates welded on the backs of their webs to substitute for the inner I-beam flanges. In FIG. 4 a pair of short angle pieces 91, 92 are shown provided on the back of a mast member channel 40*a'* to be engaged by tilt roller 67*a'*.

While mast tilt rollers 67*a*, 67*b* are shown nested in the inner recesses between flanges of I-shape members 40*a*, 40*b*, with the carriage rollers 59*a*–59*d*nested in the outer recesses of the I-shapes, it will become apparent that the carriage rollers could be nested instead in the inner recesses. Lowering of the carriage then would be limited to a condition where the lower carriage rollers engaged the tilt rollers, but with the use of slightly taller forks the fork tips could still reach the floor. It would be possible to extend crank shaft 65 under the lower ends of the mast members and locate the tilt rollers in the outer recesses, but with no apparent advantage and with the disadvantages of slightly decreasing carriage travel.

Inasmuch as very little tilting and vertical movement occurs at the upper end of the mast, various alternative mechanisms for rotating the mast are feasible. A rotary motor mounted at the location of ram 48 could drive a gear substituted for sprocket 51 via a gear train journalled on arm 34*c*.

It is also possible to locate the mast rotation mechanism below the mast instead of above it, using a ram and chain drive of the type shown, with plate 45 carrying a sprocket.

While two-axis bearings 42 and 44 have been shown as comprising ball joint bearings and such types are preferred, various other types of two-axis bearings, such as Hooke's Universal joints could be employed.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A mast assembly for a lift truck, comprising, in combination: a rigid mast having a carriage movable along said mast; mast support means including upper and lower support arms; first bearing means pivotally connecting said mast adjacent its upper end to said upper support arm for limited two-dimensional rotation of said upper end relative to said upper support arm; a tilt plate assembly having a rigid arm pivotally connected to said mast; second bearing means pivotally connecting said tilt plate assembly to said lower support arm for limited two-dimensional rotation of said tilt plate assembly relative to said lower arm; crank means journalled on said tilt plate assembly and carrying roller means, said roller means engaging said mast; means for rotating said crank means to tilt said mast; and rotational drive means for rotating said mast about an axis defined by said first and second bearing means.

2. The assembly of claim 1 wherein said crank means is journalled on said tilt plate assembly for rotation about a first axis and said rigid arm of said tilt plate assembly is connected to said mast for pivotal movement of said tilt plate assembly relative to said mast about a second axis parallel to said first axis.

3. The assembly of claim 1 wherein said upper support arm extends above the upper extremity of said mast and said lower support arm extends below the lower extremity of said mast.

4. The assembly of claim 1 wherein said first bearing means both slidingly and pivotally connects said mast to said upper support arm.

5. The assembly of claim 1 wherein said rotational drive means includes sprocket means affixed to said mast adjacent an end of said mast, a pair of extensible rams mounted adjacent one of said support arms, and a chain extending between said rams around said sprocket means.

6. The assembly of claim 1 wherein said mast comprises a pair of vertically-extending I-shape members having pairs of flanges, and wherein said roller means are nested between pairs of flanges of said I-shape members.

7. The assembly of claim 1 wherein said mast comprises a pair of vertically-extending channel members each having a pair of flanges and a web portion, a respective pair of plates mounted on the web portion of each of said channel members to form a roller track near the lower end of the channel member, said roller means engaging said roller tracks.

8. The assembly of claim 1 wherein said first and second bearings means comprise ball-joint bearings.

9. A tiltable and rotatable mast assembly for a lift truck, comprising, in combination: a rigid mast; mast support means comprising a C-shaped frame having upper and lower arms; upper bearing means pivotally connecting said mast adjacent its upper end to said upper arm to allow rotation in two dimensions of said upper end relative to said upper arm; means for transmitting vertical forces imposed on said mast to said lower arm comprising a rigid member pivotally connected to said mast and to said lower arm; and means for translating the lower end of said mast relative to said rigid member to tilt said mast about an axis passing through said upper bearing means; and means for rotating said mast about an axis defined by said upper bearing means and the pivoted connection of said rigid member to said lower arm.

* * * * *